No. 653,143. Patented July 3, 1900.
J. C. MARTIN.
HOSE COUPLING.
(Application filed Nov. 8, 1899.)
(No Model.)
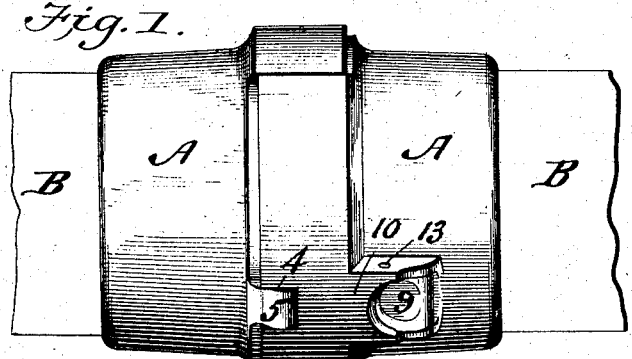
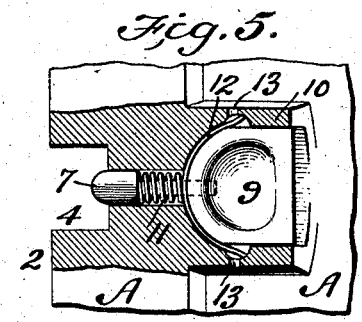
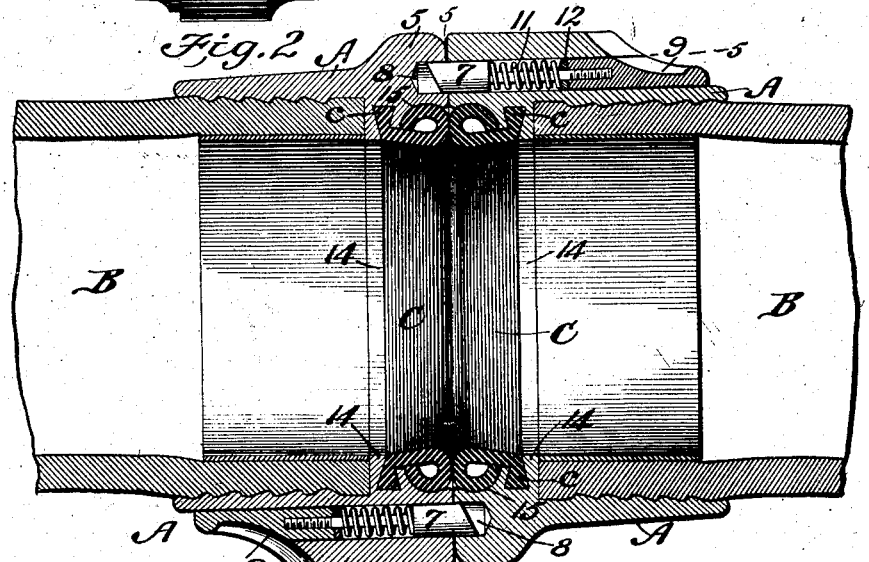
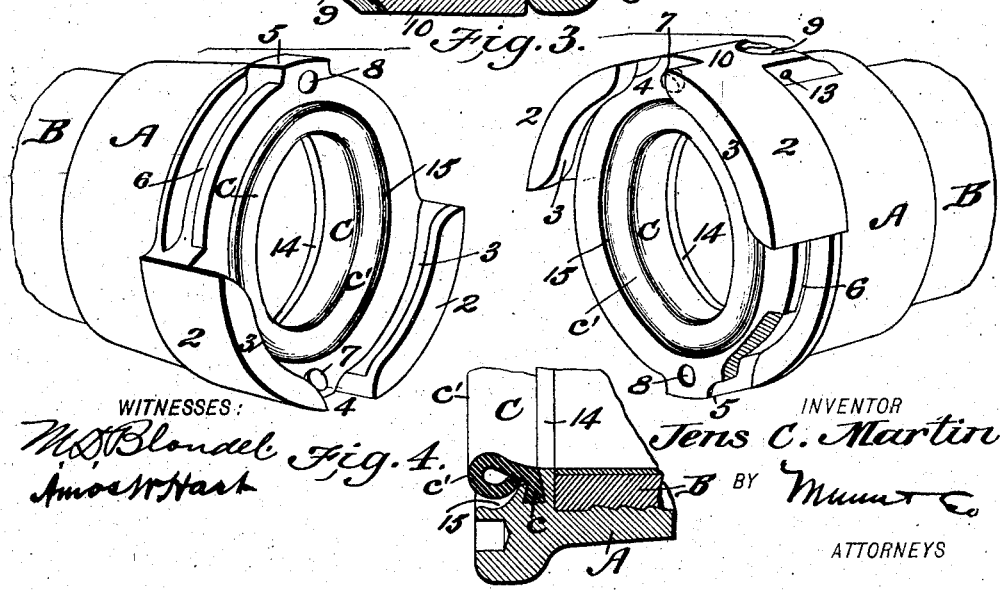
WITNESSES: INVENTOR
Jens C. Martin.
BY
ATTORNEYS

UNITED STATES PATENT OFFICE.

JENS C. MARTIN, OF SPOKANE, WASHINGTON.

HOSE-COUPLING.

SPECIFICATION forming part of Letters Patent No. 653,143, dated July 3, 1900.

Application filed November 8, 1899. Serial No. 736,232. (No model.)

*To all whom it may concern:*

Be it known that I, JENS C. MARTIN, of Spokane, in the county of Spokane and State of Washington, have invented a new and useful Improvement in Hose-Couplings, of which the following is a specification.

My invention is an improvement in firehose couplings; and it is composed of two parts or sections adapted to engage and automatically lock together, but which may be easily and quickly disengaged when required. The said parts or sections are duplicates, and each has a locking mechanism of peculiar construction and also an annular elastic gasket, which is securely held in place by a peculiar construction and is adapted to be expanded by water-pressure, so as to form a perfectly-tight joint under all conditions.

The details of construction and combination of parts are hereinafter described, reference being had to the accompanying drawings, in which—

Figure 1 is a plan or side view of my coupling in engaged position. Fig. 2 is a longitudinal section of the same. Fig. 3 is a perspective view of the two coupling parts or sections separated. Fig. 4 is a detail section showing the form and position of the gasket when not subjected to water-pressure. Fig. 5 is an enlarged detail section on line 5 5, Fig. 2, showing the locking-latch.

The two engaging parts or coupling-sections A A are duplicates in every respect. The hose B is attached to each part A in a well-known manner and abuts an internal shoulder 14, which also serves as a seat for a rubber gasket C.

As shown in Fig. 3, each coupling-section A has on one side two undercut clutch members 2, consisting of segmental projections having internal ribs or flanges 3. These clutch members 2 are separated by a narrow space 4, which is adapted to receive a boss 5 on the opposing part of the other section A. On each side of said boss 5 are segmental grooves 6, which are adapted to receive ribs or flanges 3 of the clutch members 2 of the other part or section. Thus when the sections A A are put together by a sliding lateral movement the boss 5 of one enters the space 4 of the other section and the clutch-flanges 3 of each section enter the grooves 6 of the other. In this lateral sliding engagement of the sections A A the boss 5 of each serves as a guide, since if it does not directly enter space 4 between the clutch members 2 it strikes against one of said members and slides along the same until it reaches and passes into the space 4, and when once in place there it aids in preventing torsion or rotation of one section upon the other. Thus the parts A A are held securely against separation longitudinally. To lock them thus against lateral displacement or disengagement, I employ two automatic spring-actuated latches or catches, consisting of slidable pins 7, each of which is arranged in a lengthwise bore in the respective sections and projects into the space 4 between the clutch members 2. Each part A has also a bore or socket 8 in its boss 5, as shown in Fig. 3, to receive the locking latch-pin 7 of the other section. Each latch 7 is beveled to adapt it to be pressed down in the act of engaging the sections A A, and thus automatically lock them together. It is apparent they can only be retracted by a pull applied manually. Thus the sections A A have duplicate locking devices, by which security is afforded, since if for any reason one lock fails to act the other may be relied upon to perform its function efficiently.

The aforesaid locking latches or catches proper, 7, have slightly tapered and threaded shanks, (see Figs. 1 and 5,) which screw into broad metal pieces 9, having exterior recesses to adapt them for a secure finger-hold. These parts 9 are termed "latch-pulls." They are adapted to slide freely in and protected by housings 10, formed on one side of each coupling-section A. A spiral spring 11 encircles the shanks of the latches or pins 7, and a curved or segmental plate-spring 12 lies between the said spiral spring 11 and semicircular heads of the latch-pulls 9. The housings 10 cover and protect the latches against injury by contact with other objects. The relative length or proportions of the latchpulls 9 to the housings and the arrangement of the springs are such that the pulls cannot be drawn out so far as to expose their inner or semicircular ends, and hence dust, slush, &c., are prevented from entering, and thus from interfering with the proper workings of the lock proper. The ends of said platesprings 12 are bent slightly outward and rest in lateral recesses in the housing 10. Lateral holes 13 are provided at these points, through which a stout wire or other suitable instrument may be inserted for pressing upon the ends of the segmental spring 12 for the purpose of removing the entire latch mechanism when required.

Each coupling-section has an annular gasket C, formed of rubber, which is but slightly vulcanized, so as to have due elasticity. The gaskets are held in place by means of their outturned edges c being compressed, and thus fitted closely in a dovetail groove in sections A. (See Figs. 2 and 4.) One side of such groove is formed of an annular rib 14, against which the hose B abuts. The free outer ends of the gaskets C are turned over outward, so as to form a loop c', having a rounded edge, and this part is adapted to fit in an annular groove or socket 15, (see Fig. 4,) formed in the surrounding portion of a coupling-section A. As will be seen in Fig. 4, the outer edge c of a gasket C projects slightly beyond the adjacent edge of the section A. This is for the purpose of enabling such looped portions or edges c' of the gaskets to meet and close up, so as to form a water-tight joint when the two sections A A are connected, as shown in Fig. 2, and the hose is filled with water. In the act of engaging the sections A A by the rotary sliding movement required the meeting of the faces or edges c' tends to force the latter inward and away from the seat 15, as shown in Fig. 4; but when subjected to water-pressure such edges are compressed in the annular seat or groove 15. This adaptability of the free edges of the gaskets C to go back into said sockets 15 is an important one. The loop form of the gasket gives it a good degree of expansion, so that it resists the water-pressure and is thus flattened, so as to make a close joint and at the same time oppose no serious obstruction to the free flow of water through the hose.

It is apparent that, since the parts or sections A A are duplicates, there can never be a misfit or failure to couple two lengths of hose, as may occur in the case of coupling-sections differing in construction.

The coupling is particularly strong and secure as relates to a longitudinal strain, and accidental lateral disconnection of the sections is practically impossible.

Having thus described my invention, what I claim, and desire to secure by Letters Patent, is—

1. In a hose-coupling, the combination of the duplicate coupling-sections, each having engaging segmental flanges and grooves and provided with a space between said flanges, and a corresponding tenon or boss on the opposite side, and means for locking the sections when duly engaged, substantially as shown and described.

2. In a hose-coupling, the combination of the duplicate coupling-sections, each having two projecting segmental clutch members which are separated by a space, and on the opposite side two arc grooves and an intermediate boss, and slidable spring-latches for automatically locking the sections together when laterally engaged, substantially as shown and described.

3. In a hose-coupling, the combination of duplicate coupling sections, having segmental clutch members 2 and 3, which are separated as specified, and an opposite boss, which, when the sections are engaged by a sliding lateral movement, enters the space between said members, and thus serves as a guide, as shown and described.

4. In a hose-coupling, the combination with coupling-sections, of a slidable locking-latch, a spiral spring encircling the same, a finger-pull forming a part of the latch and a curved plate-spring interposing said spiral spring and finger-pull, as shown and described.

5. In a hose-coupling, the combination of a coupling-section provided with a lateral housing having internal lateral recesses, a slidable locking-latch composed of a pin and finger piece or pull, which parts are detachably connected, and a curved or segmental spring applied between said pin and pull-piece, with ends resting in said recesses, as shown and described.

6. In a hose-coupling, the combination of two sections adapted to be engaged and locked together and each provided with an internal dovetail socket or groove located adjacent to the face, and two annular gaskets which are held in the respective sockets, the interior hollow portions of the gaskets projecting circumferentially toward each other so that when the coupling is effected the gaskets are in position to be acted on by the pressure of water and to yield and flatten thereunder, as shown and described.

7. In a hose-coupling, the combination, with sections adapted to be coupled, of two expansible gaskets formed of duly-elastic material, the bases of said gaskets being inserted in grooves formed in the inner sides of such coupling-sections, and their free edges being turned outward and then inward upon themselves and forming hollow rings or loops which project beyond the ends of the sections, and sockets formed in the inner portions of the sections, as shown and described, whereby the entire inner sides of the loops present an unbroken and smooth surface, as specified.

JENS C. MARTIN.

Witnesses:
P. C. SHINE,
FRANK CLARK.